United States Patent
Venugopalan et al.

(10) Patent No.: US 10,666,578 B2
(45) Date of Patent: May 26, 2020

(54) NETWORK-ON-CHIP SYSTEM AND A METHOD OF GENERATING THE SAME

(71) Applicant: TAIWAN SEMICONDUCTOR MANUFACTURING COMPANY LTD., Hsinchu (TW)

(72) Inventors: Ravi Venugopalan, Dublin, CA (US); Sandeep Kumar Goel, Dublin, CA (US); Yun-Han Lee, Hsinchu County (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

(21) Appl. No.: 15/257,210

(22) Filed: Sep. 6, 2016

(65) Prior Publication Data
US 2018/0069807 A1    Mar. 8, 2018

(51) Int. Cl.
*H04L 12/933* (2013.01)
*H04L 12/707* (2013.01)
*H04L 12/703* (2013.01)

(52) U.S. Cl.
CPC ............ *H04L 49/109* (2013.01); *H04L 45/22* (2013.01); *H04L 45/28* (2013.01)

(58) Field of Classification Search
CPC ............................. H04L 49/109; H04L 45/22
See application file for complete search history.

(56) References Cited

U.S. PATENT DOCUMENTS

| | | | | |
|---|---|---|---|---|
| 2011/0302345 | A1* | 12/2011 | Boucard | H04L 47/10 710/123 |
| 2014/0201406 | A1* | 7/2014 | Balakrishnan | G06F 1/3203 710/110 |
| 2014/0211622 | A1* | 7/2014 | Kumar | H04L 47/125 370/235 |
| 2016/0283314 | A1* | 9/2016 | Thanner | G06F 11/0793 |
| 2017/0177778 | A1* | 6/2017 | de Lescure | G06F 17/5072 |
| 2018/0052790 | A1* | 2/2018 | Naylor | G06F 13/362 |

* cited by examiner

*Primary Examiner* — Peter P Chau
(74) *Attorney, Agent, or Firm* — Juan Carlos A. Marquez; Marquez IP Law Office, PLLC

(57) ABSTRACT

A network-on-chip (NoC) system includes a default communication path between a master device and a slave device, and a backup communication path between the master device and the slave device. The default communication path is configured to work in a normal operation state of the chip. The backup communication path is configured to replace the default communication path when a fault arises in the default communication path.

15 Claims, 11 Drawing Sheets

NETWORK-ON-CHIP SYSTEM AND A METHOD OF GENERATING THE SAME

BACKGROUND

Network-on-chip (NoC) is an interconnect fabric technology used in system-on-chip (SoC) semiconductor designs for a variety of applications, for example, automotive, industrial and medical applications. These applications require resilience features that target mission critical use cases. NoC inside an SoC carries data traffic from a source processing end such as a central processing unit (CPU) to a destination processing end such as a memory device, and vice versa. While NoC architectures have emerged as a scalable and reliable alternative to the traditional bus-based communication paradigms, with continuous scaling of semiconductor technologies, reliability has become a primary concern in NoC designs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
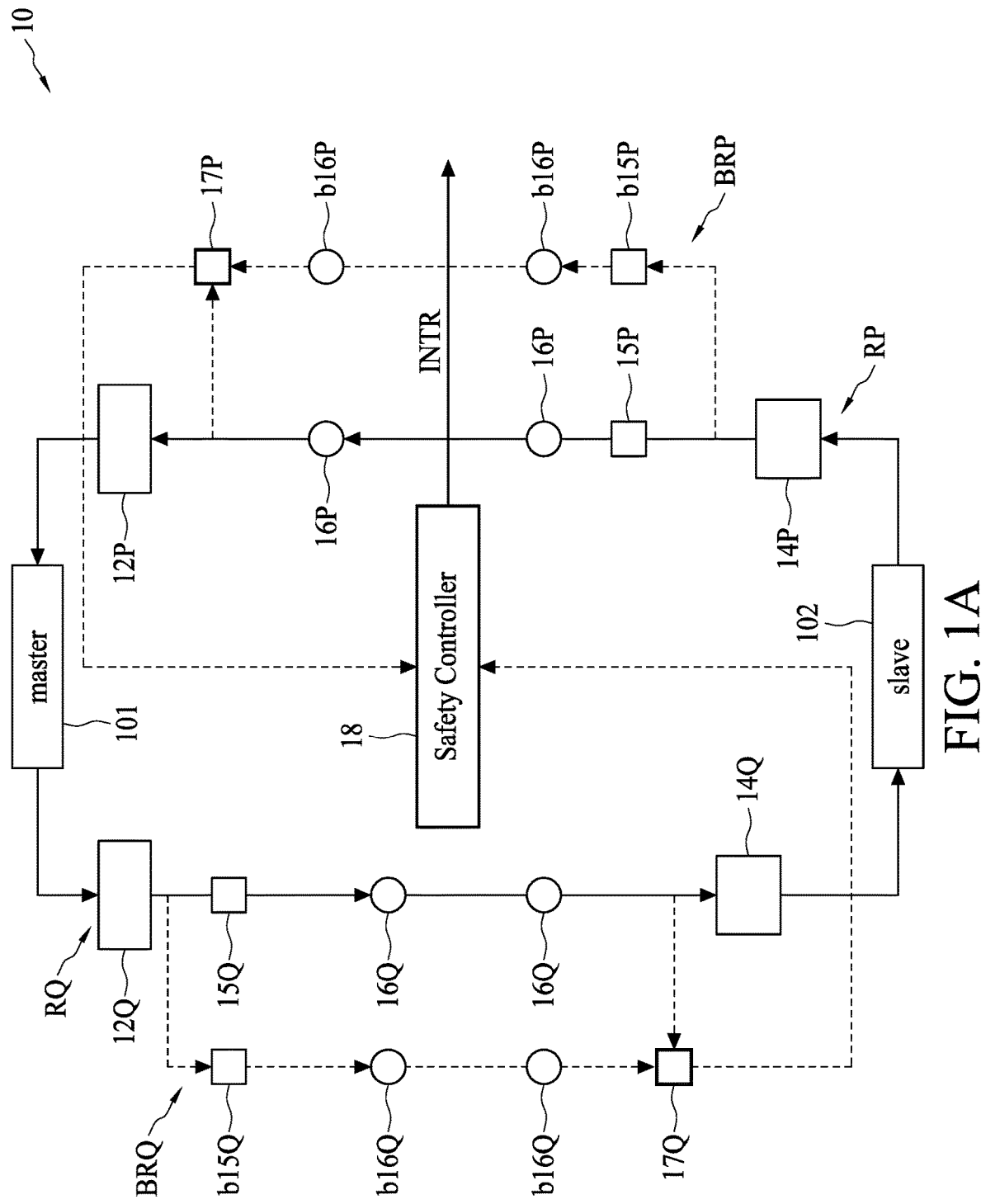
FIG. 1A is a block diagram of a network-on-chip (NoC) system in accordance with an embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a block diagram of a network-on-chip (NoC) system 10 in accordance with an embodiment. Referring to FIG. 1A, the NoC system 10 includes a mater device 101, a slave device 102, and a number of NoC modules between the mater device 101 and the slave device 102. The master device 101 sends request packets via a default request path RQ to the slave device 102, and the slave device 102 returns response packets via a default response path RP to the master device 101 in the NoC system 10. In addition, in the NoC system 10, the master device 101 sends request packets via a backup request path BRQ to the slave device 102 when a reliability issue arises in the default request path RQ. Moreover, the slave device 102 returns response packets via a backup response path BRP to the master device 101 when a reliability issue arises in the default response path RP. The default request path RQ and default response path RP can be configured independently. Similarly, the backup request path BRQ and the backup response path BRP associated with the default request path RQ and the default response path RP, respectively, can also be configured independently.

In the default request path RQ, the NoC system 10 includes a slave module 12Q, a clock synchronizer module 15Q, one or more router modules 16Q, and a master module 14Q. These NoC modules 12Q, 15Q, 16Q and 14Q are connected between the master device 101 and the slave device 102 by wires. Since the NoC modules 12Q, 15Q, 16Q and 14Q have been widely used in a NoC network, their functions are only briefly discussed below.

The slave module 12Q, disposed near the master device 101, serves as an interface or adapter for the master device 101. Likewise, the master module 14Q, disposed near the slave device 102, serves as an interface or adapter for the slave device 102. The synchronizer module 15Q, disposed between the slave module 12Q and the router module 16Q, serves as a buffer for synchronizing and queuing data packets transferred in the default request path RQ. Each or the router modules 16Q serves as a switch and receives and forwards data packets.

In the default response path RP, the NoC system 10 includes a master module 14P, a clock synchronizer module 16P, one or more router modules 16P, and a slave module 12P. These NoC modules 14P, 15P, 16P and 12P are substantially similar to or the same as the NoC modules 14Q, 15Q, 16Q and 12Q, respectively, and are not further discussed.

In the backup request path BRQ, the NoC system 10 includes a dock synchronizer module b15Q, one or more router modules b16Q, and a data checker 17Q between the master device 101 and a safety controller 18. The data checker 17Q detects if a fault or a reliability issue arises in the default request path RQ. If affirmative, the safety controller 18 sends an interrupt signal INTR to the master device 101 or other master devices (not shown) to which the fault may be related. The master device at issue may then resend data in response to the interrupt signal INTR. The NoC modules b15Q and b16Q are substantially similar to or the same as the NoC modules 15Q and 16Q, respectively. In the present embodiment, an input of the data checker 17Q is connected to an input of the master module 14Q. In another embodiment, however, the input of the data checker 17Q is connected to an output of the master module 14Q.

In the backup response path BRP, the NoC system 10 includes one or more router modules b16P, a clock synchronizer module b15P, and a data checker 17P between the slave device 102 and the safety controller 18. The data checker 17P detects if a fault or a reliability issue arises in the default response path RP. If affirmative, the safety controller 18 sends an interrupt signal INTR to the master device 101 or other master devices to which the fault may be related. The master device at issue may then resend data in response to the interrupt signal INTR. The NoC modules b15P and b16P are substantially similar to or the same as the NoC modules 15P and 16P, respectively. In the present embodiment, an input of the data checker 17P is connected to an input of the slave module 12P. In another embodiment, the input of the data checker 17P is connected to an output of the slave module 12P.

The NoC system 10 may be configured in a semiconductor design for integrated circuit (IC) or field programmable gate array (FPGA) application, and may be constructed in a system on chip (SoC) IC in a modular fashion by combining a set of intellectual property (IP) cores. For example, the master device 101 includes but is not limited to one of a central processing unit (CPU), a graphic processing unit (GPU), a digital signal processor (DSP), a memory controller and a video and networking processing block. Furthermore, the slave device 102 may include one of a static random access memory (SRAM), a dynamic random access memory (DRAM), a read-only memory (ROM), a memory that supports double data rate transfer, or a timer.

NoC modules are susceptible to reliability issues like any other IP in a SoC. Malfunction of the chip occurs when NoC modules face a reliability issue that hampers data communication between different parts of the SoC. In some existing NoC networks, only one default request path and only one default response path are configured for data traffic between a master device and a slave device. Since in such mechanism no NoC connectivity is duplicated for the default communication paths, a reliability issue can cause the SoC to malfunction. In contrast, the NoC system 10 provides a backup request path BRQ for a default request path RQ, and a backup response path BRP for a default response path RP. As a result, when a fault arises in the default request path RQ, the backup request path BRQ functions to replace the default request path RQ so as to ensure data traffic safety. Also, when a fault arises in the default response path RP, the backup response path BRP functions to replace the default response path RP so as to ensure data traffic safety. Effectively, by providing a backup communication path, the NoC system 10 protects the SoC from malfunction when a fault or a reliability issue arises in a corresponding default communication path.

Figure 1B:
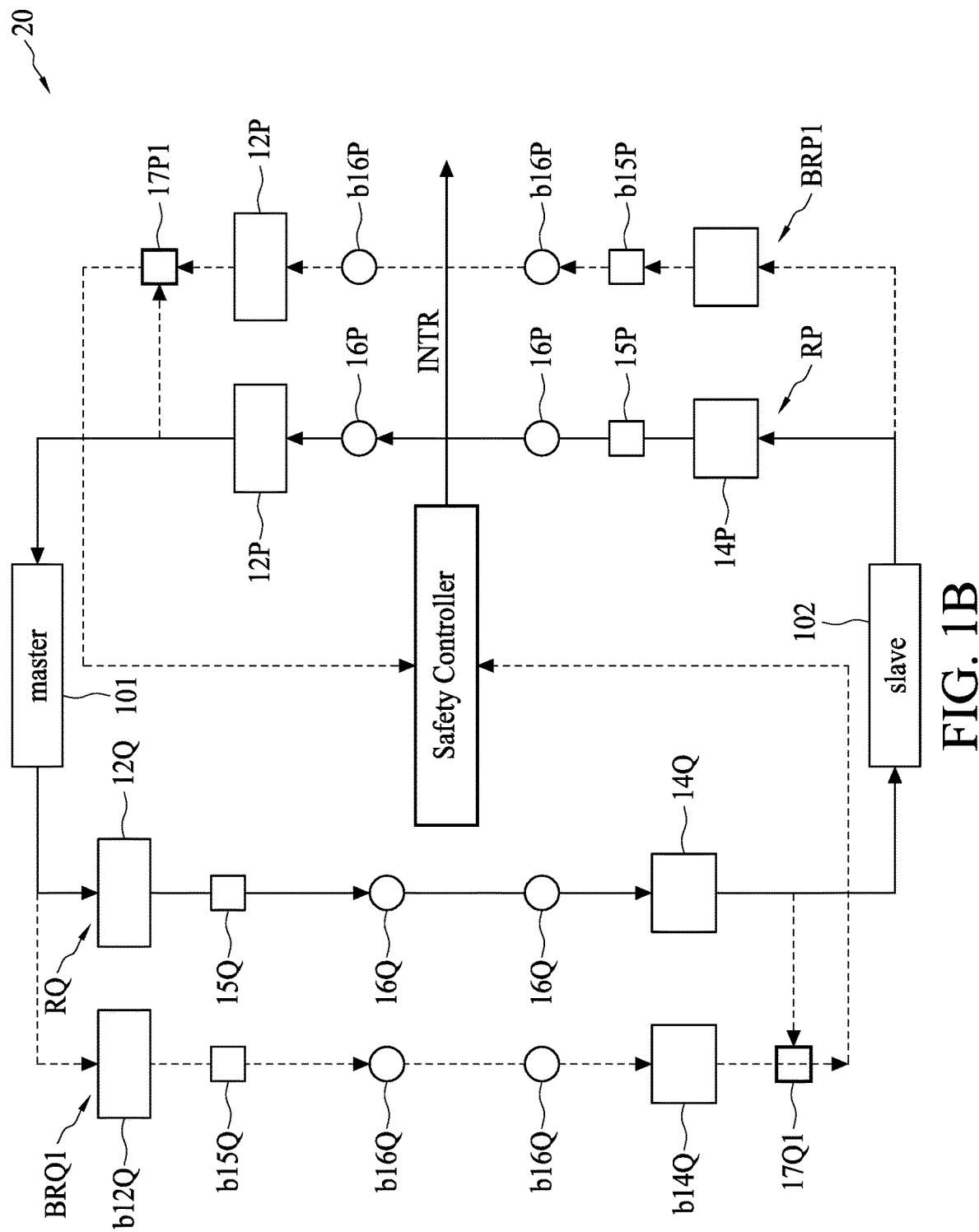
FIG. 1B is a block diagram of a NoC system in accordance with another embodiment.

FIG. 1B is a block diagram of a NoC system 20 in accordance with another embodiment. Referring to FIG. 1B, the NoC system 20 is similar to the NoC system 10 described and illustrated with reference to FIG. 1A except that, for example, a backup request path BRQ1 replaces the backup request path BRQ, and a backup response path BRP1 replaces the backup response path BRP. Specifically, the NoC system 11 includes in the backup request path BRQ1 a slave module b12Q and a master module b14Q in addition to the synchronizer module b15Q and the router modules b16Q. As a result, all the NoC modules 12Q, 15Q, 16Q and 14Q in the default request path RQ are duplicated in the backup request path BRQ1. Moreover, the NoC system 20 includes in the backup response path BRP1 a master module b14P and a slave module b12P in addition to the synchronizer module b15P and the router modules b16P. As a result, all the NoC modules 14P, 15P, 16P and 12P in the default response path RP are duplicated in the backup response path BRP1.

Furthermore, the NoC system 20 includes in the backup request path BRQ1 a data checker 17Q1. The data checker 17Q1 includes an input to receive an output from the duplicated master module b14Q in the backup request path BRQ1, another input to receive an output from the master module 14Q in the default request path BRQ, and an output connected to the safety controller 18. Similarly, the NoC system 20 includes in the backup response path BRP1 a data checker 17P1. The data checker 17P1 includes an input to receive an output from the duplicated slave module b12P in the backup response path BRP1, another input to receive an output from the slave module 12P in the default response path BRP, and an output connected to the safety controller 18.

Figure 1C:
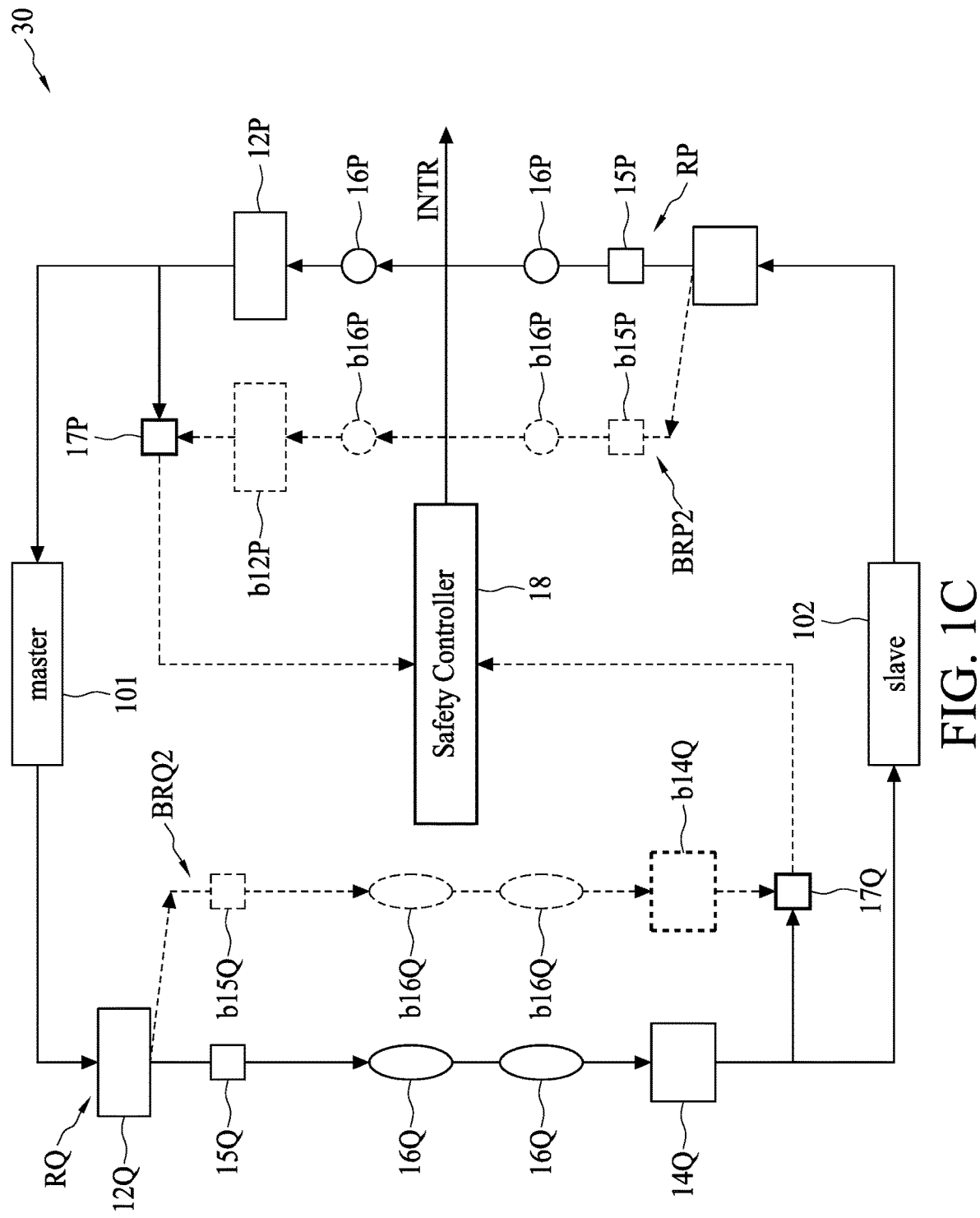
FIG. 1C is a block diagram of a NoC system in accordance with still another embodiment.

FIG. 1C is a block diagram of a NoC system 30 in accordance with still another embodiment. Referring to FIG. 1C, the NoC system 30 is similar to the NoC system 20 described and illustrated with reference to FIG. 1B except that, for example, a backup request path BRQ2 replaces the backup request path BRQ1, and a backup response path BRP2 replaces the backup response path BRP1. Specifically, the NoC system 30 includes a duplicated master module b14Q in the backup request path BRQ2, and a duplicated slave module b12Q in the backup response path BRP2. Alternatively, in an embodiment, in the backup request path BRQ2, the NoC system 30 may include one of the duplicated slave module b12Q and master module b14Q but not both. In another embodiment, in the backup response path BRP2, the NoC system 30 may include one of the duplicated master module b14Q and slave module b12Q but not both. As a result, duplicated NoC modules in a backup communication path may only include synchronizer module and router module, as in the case of FIG. 1A, may further include master module and slave module in addition to the synchronizer module and router module, as in the case of FIG. 1B, and may include one of the master module and slave module, as in the case of FIG. 1C.

Figure 2A:
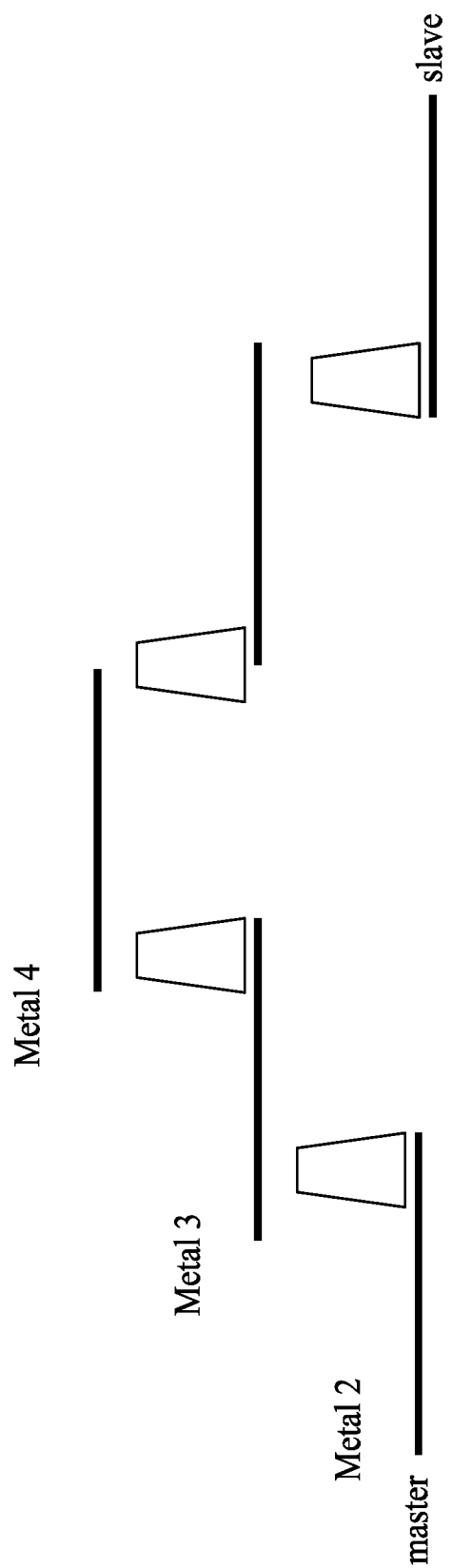
FIGS. 2A and 2B are schematic diagrams showing routing structures of a default communication path and a backup communication path, respectively, in accordance with some embodiments.
Figure 2B:
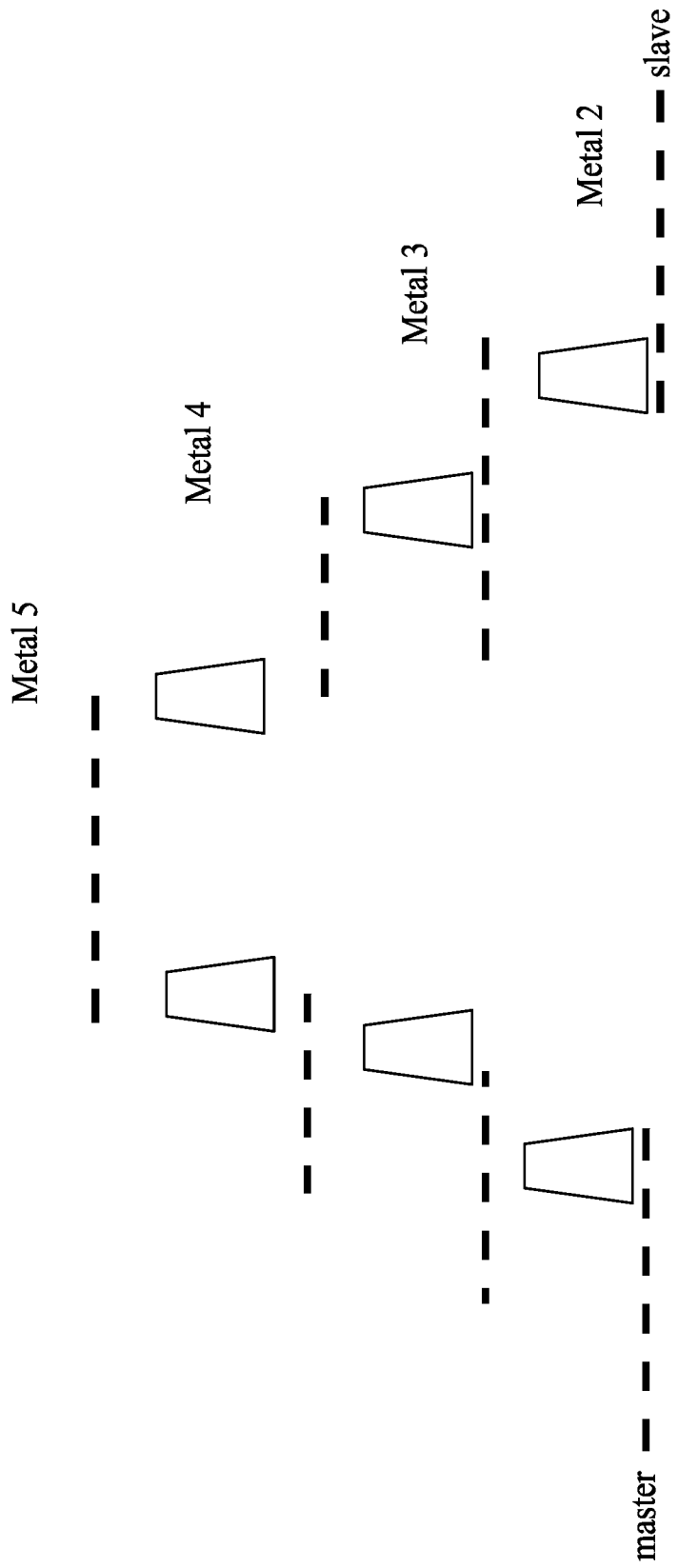

FIGS. 2A and 2B are schematic diagrams showing routing structures of a default communication path and a backup communication path, respectively, in accordance with some embodiments. A default communication path and a corresponding backup communication path may be routed via different conductive layers in a chip. For example, referring to FIG. 2A, a default communication path, such as the default request path RQ or default response path RP in FIG. 1A, 1B or 1C, is routed via conductive layers M2, M3 and M4. Furthermore, referring to FIG. 2B, a corresponding backup communication path such as the backup request paths BRQ, BRQ1 and BRQ2 respectively shown in FIGS. 1A, 1B and 1C, or the backup response paths BRP, BRP1 and BRP2 respectively shown in FIGS. 1A, 1B and 1C, is routed via conductive layers M2, M3, M4 and M5. Alternatively, while a default communication path is routed via M2, M3 and M4 layers, the corresponding backup communication path may be routed via M2, M3 and M5 layers, or M2, M4 and M5 layers, or other suitable conductive layers.

Figure 2C:
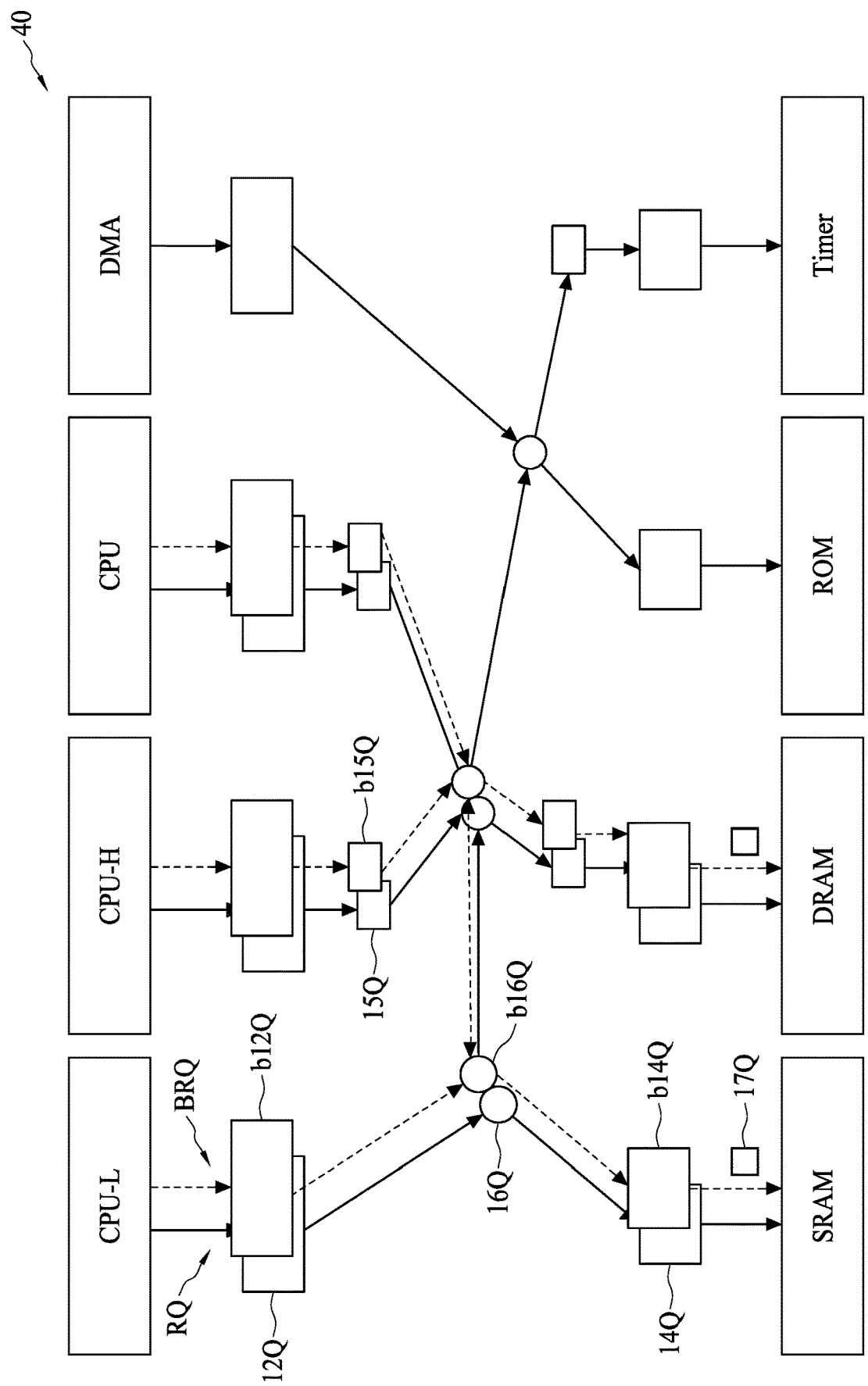
FIG. 2C is a schematic diagram of a NoC system in accordance with an embodiment.

FIG. 2C is a schematic diagram of a NoC system 40 in accordance with an embodiment. Referring to FIG. 2C, the NoC system 40 includes NoC modules, a number of master devices including a low-end CPU (labeled CPU-L), a high-end CPU (labeled CPU-H), a GPU and a direct memory access (DMA) controller, and a number of slave devices including an SRAM, a DRAM, a ROM and a timer. For brevity, not every NoC module is labeled and only default request paths (shown by solid-line arrows) and backup request paths (shown by dashed-line arrows) are shown. In the present embodiment shown in FIG. 2C, a default request path and a corresponding backup request path are routed via different conductive layers. Moreover, backup request paths are disposed proximate to their respective default request paths. As a result, duplicated NoC modules are physically placed close to their respective default NoC modules.

Figure 3:
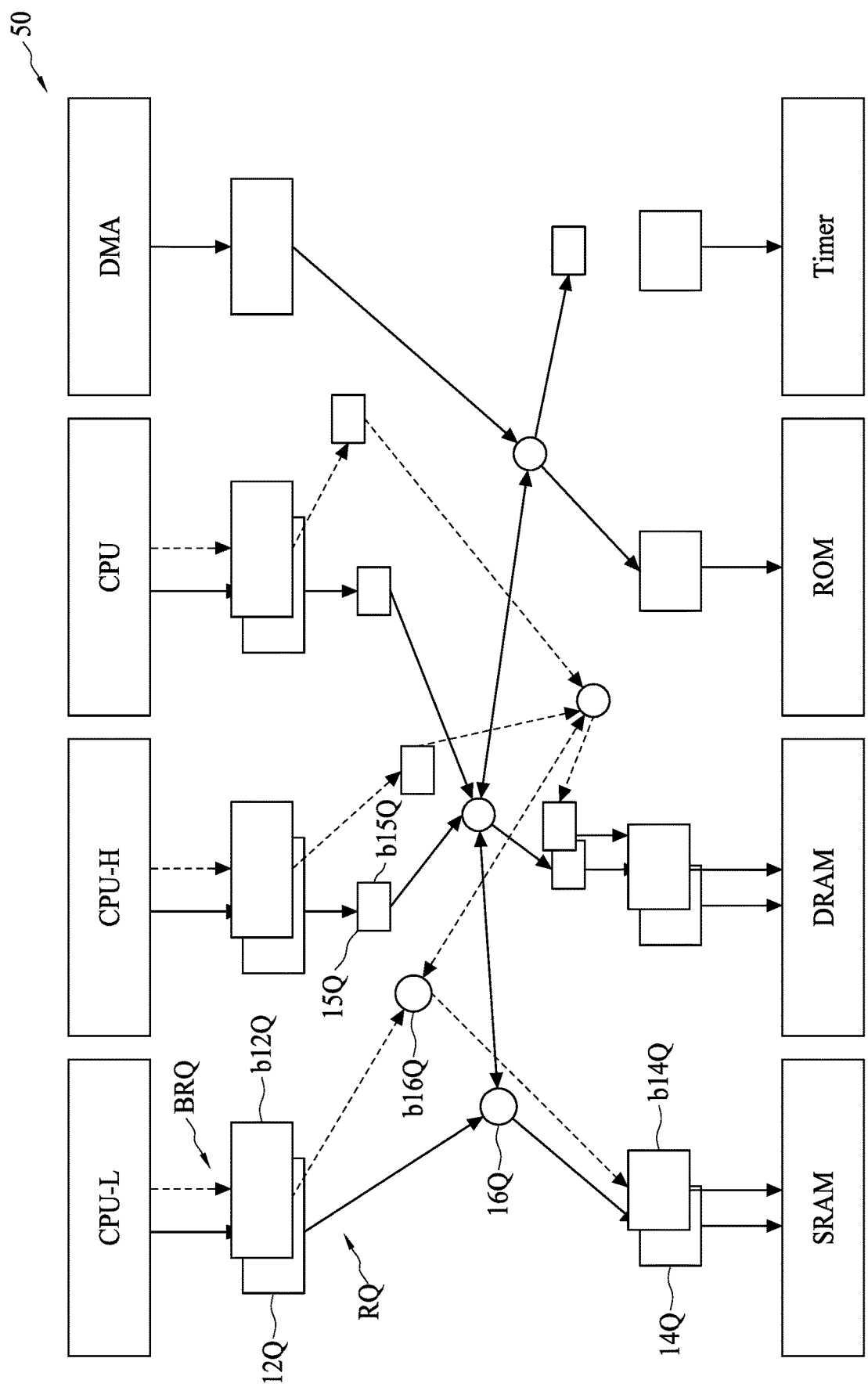
FIG. 3 is a schematic diagram of a NoC system in accordance with another embodiment.

FIG. 3 is a schematic diagram of a NoC system 50 in accordance with another embodiment. Referring to FIG. 3, the NoC system 50 is similar to the NoC system 40 described and illustrated with reference to FIG. 2C except that, for example, a default request path and a corresponding backup request path are routed via different paths in a same set of conductive layers, for example, the M2, M3 and M4 layers. The backup request paths and their respective default request paths may be spaced relatively apart from each other.

Embodiments described and illustrated with reference to FIGS. 1A-1C, 2A, 2B and 3 provide reliable data traffic by duplicating a default communication path. In other embodiments, as will be discussed with reference to FIGS. 4 and 5, reliable data traffic is achieved by duplicating NoC modules of interest in a default communication path.

Figure 4:
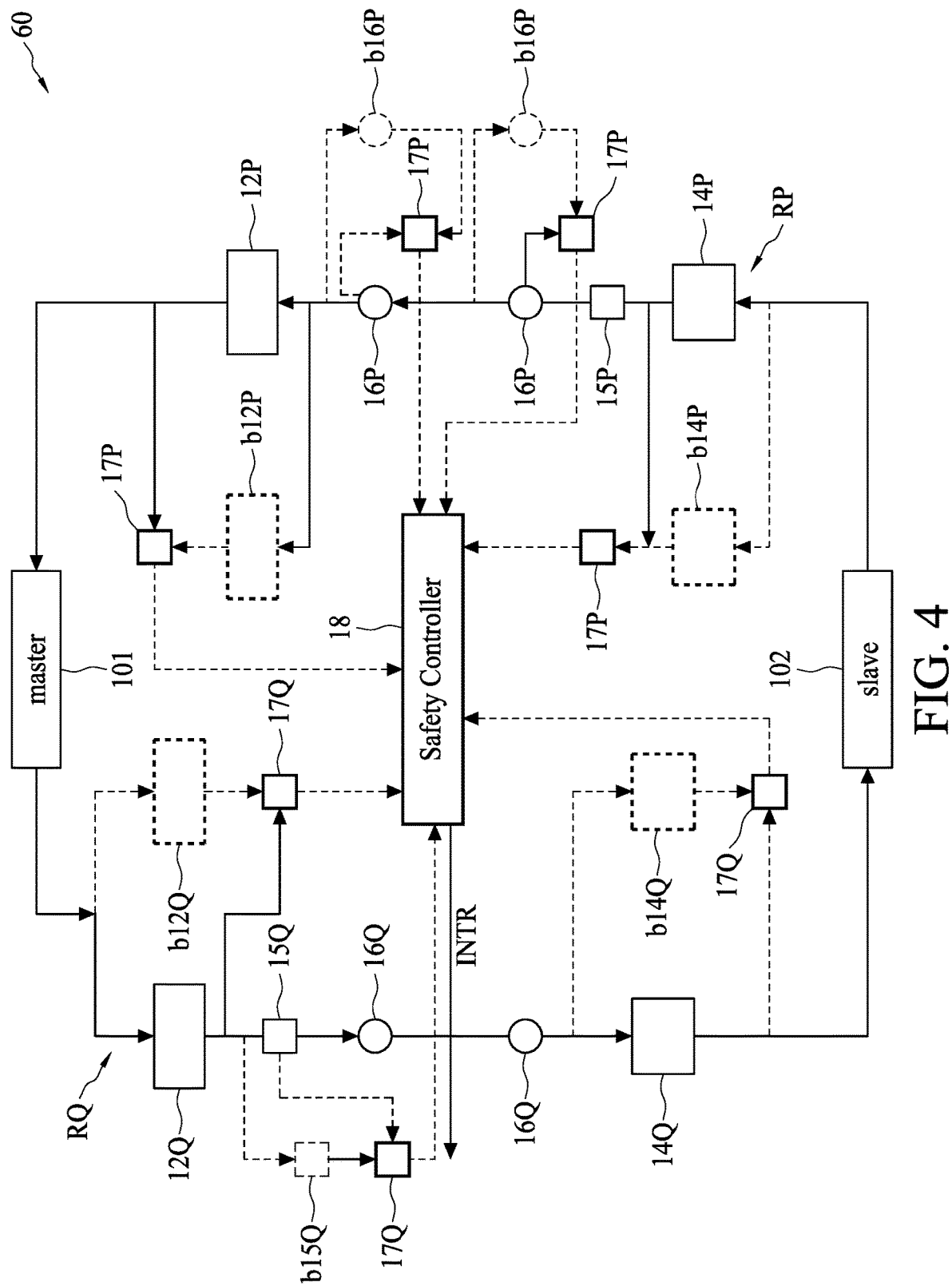
FIG. 4 is a block diagram of a NoC system in accordance with an embodiment.

FIG. 4 is a block diagram of a NoC system 60 in accordance with an embodiment. Referring to FIG. 4, the NoC system 60 includes a default request path RQ and a default response path RP. In the default request path RQ, the slave module 12Q, synchronizer module 15Q and master module 14Q are duplicated, resulting in a duplicated slave module b12Q, duplicated synchronizer module b15Q and duplicated master module b14Q. These duplicated NoC modules b12Q, b15Q and b14Q may be placed close to the default NoC modules 12Q, 15Q and 14Q, respectively. Moreover, a data checker 17Q is added at an output each of the duplicated slave module b12Q, duplicated synchronizer module b15Q and duplicated master module b14Q to check data integrity. Specifically, a data checker 17Q is disposed between the duplicated synchronizer module b15Q and the safety controller 18, and also disposed between the synchronizer module 15Q and the safety controller 18. In addition, another data checker 17Q is disposed between the duplicated slave module b12Q and the safety controller 18, and also disposed between the slave module 12Q and the safety controller 18. Further, still another data checker 17Q is disposed between the duplicated master module b14Q and the safety controller 18, and also disposed between the master module 14Q and the safety controller 18.

Likewise, in the default response path RP, the master module 14P, router modules 16P and slave module 12P are duplicated, resulting in a duplicated master module b14P, duplicated router modules b16P and duplicated slave module b12P. These duplicated NoC modules b14P, b16P and b12P may be placed close to the default NoC modules 14P, 16P and 12P, respectively. Moreover, a data checker 17P is added at an output each of the duplicated master module b14P, duplicated router modules b16P and duplicated slave module b12P to check data integrity. Specifically, a data checker 17P is disposed between the duplicated master module b14P and the safety controller 18, and also disposed between the master module 14P and the safety controller 18. In addition, another data checker 17P is disposed between the duplicated router module b16P and the safety controller 18, and also disposed between the router module 16P and the safety controller 18. Further, still another data checker 17P is disposed between the duplicated slave module b12P and the safety controller 18, and also disposed between the slave module 12P and the safety controller 18.

Figure 5:
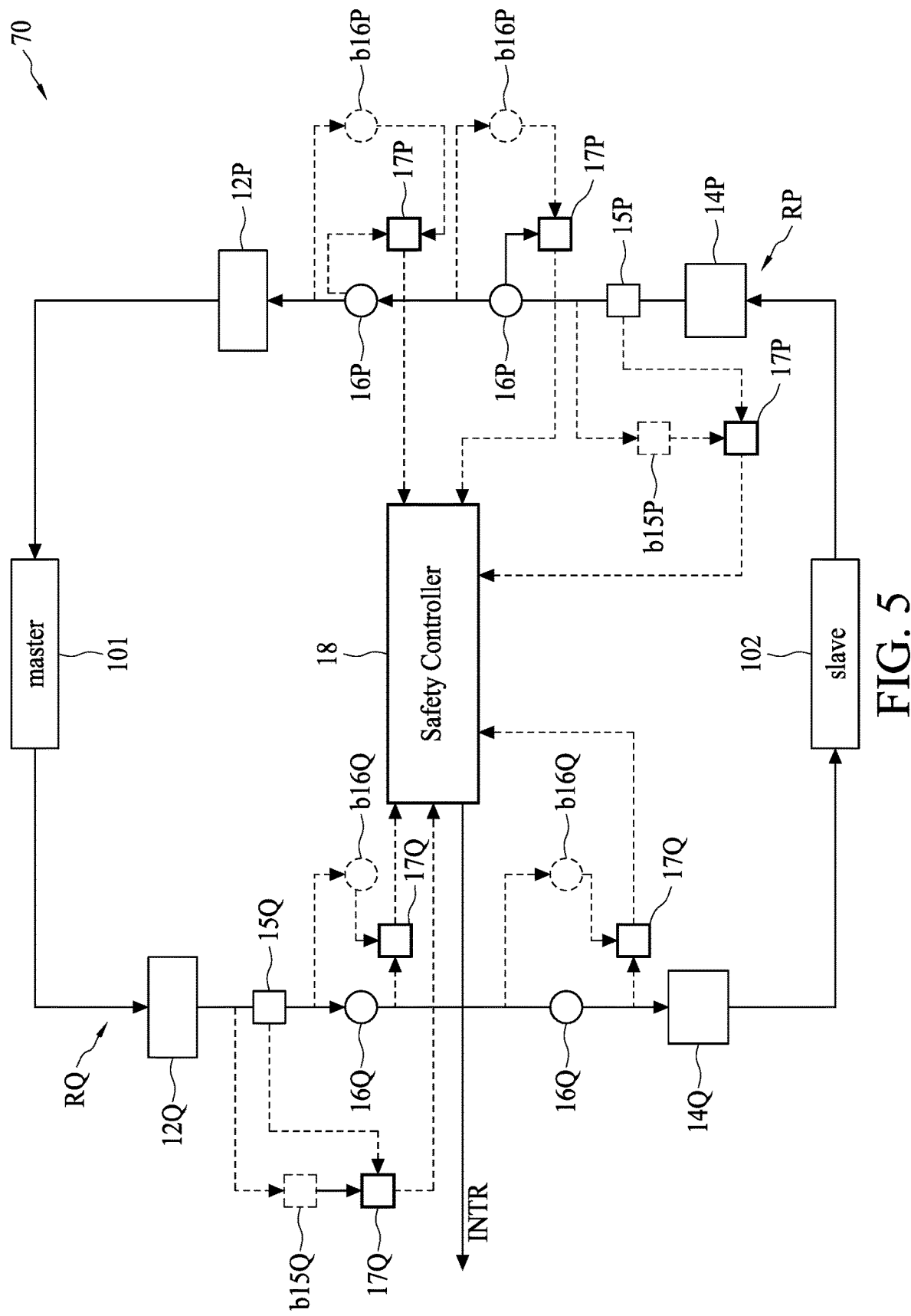
FIG. 5 is a block diagram of a NoC system in accordance with another embodiment.

FIG. 5 is a block diagram of a NoC system 70 in accordance with another embodiment. Referring to FIG. 5, the NoC system 70 is similar to the NoC system 60 described and illustrated with reference to FIG. 4 except that, for example, each NoC modules except the slave module 12Q and the master module 12Q is duplicated. The NoC system 70 includes a default request path RQ and a default response path RP. In the default request path RQ, each of the synchronizer module 15Q and the router module 16Q is duplicated, resulting in a duplicated synchronizer module b15Q and duplicated router modules b16Q. These duplicated NoC modules b15Q and b16Q may be placed close to the default NoC modules 15Q and 16Q, respectively. Moreover, a data checker 17Q is added at an output each of the duplicated synchronizer module b15Q and duplicated router modules b16Q to check data integrity. Specifically, a data checker 17Q is disposed between the duplicated synchronizer module b15Q and the safety controller 18, and also disposed between the synchronizer module 15Q and the safety controller 18. In addition, another data checker 17Q is disposed between the duplicated router module b16Q and the safety controller 18, and also disposed between the router module 16Q and the safety controller 18.

Likewise, in the default response path RP, each of the synchronizer module 15P and the router modules 16P is duplicated, resulting in a duplicated synchronizer module b15P and duplicated router modules b16P. These duplicated NoC modules b15P and b16P may be placed close to the default NoC modules 15P and 16P, respectively. Moreover, a data checker 17P is added at an output each of the duplicated synchronizer module b15P and the duplicated router modules b16P to check data integrity. Specifically, a data checker 17P is disposed between the duplicated synchronizer module b15P and the safety controller 18, and also disposed between the synchronizer module 15P and the safety controller 18. In addition, another data checker 17P is disposed between the duplicated router module b16P and the safety controller 18, and also disposed between the router module 16P and the safety controller 18.

Figure 6:
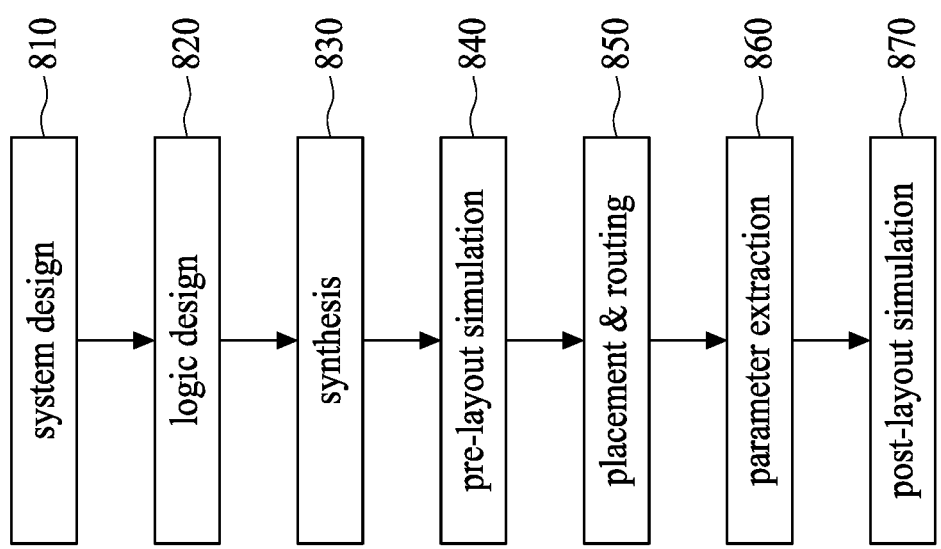
FIG. 6 is a diagram illustrating a design flow for a NoC system in accordance with some embodiments.

FIG. 6 is a diagram illustrating a design flow 80 for a NoC system in accordance with some embodiments. The design flow 80 facilitates building a NoC system in a chip. Referring to FIG. 6, the design flow 80 employed for designing a NoC architecture in a semiconductor chip, utilizes one or more electronic design automation (EDA) tools to facilitate design operations. A workstation or personal computer is used in executing the tools to accomplish the design flow 80. The design flow 80 comprises a system design stage 810, a logic design stage 820, a synthesis stage 830, a pre-layout simulation stage 840, a placement and routing stage 850, a parameter extraction stage 860 and a post-layout simulation stage 870.

Initially, at the system design stage 810, a systematic architecture for the chip of interest is provided with a high level description. In that stage, each function of the chip along with performance requirements is determined according to a design specification. Those functions are usually represented by respective schematic functional modules or blocks. In addition, an optimization or performance trade-off may be sought in order to achieve the design specification with affordable cost and power.

At the logic design stage 820, the functional modules or blocks are described in a register transfer level (RTL) using a hardware description language. The language tools are usually available from commercial software, for example, Verilog or VHDL. A preliminary functionality check is performed at the logic design stage 820 to verify if the implemented functions conform to the specification set forth in the system design stage 810.

Subsequently, at the synthesis stage 830, the modules in RTL descriptions are converted into a netlist data where circuit structure, for example, logic gates and registers, in each function module are established. Mapping of such logic gates and registers to available cells in a standard cell library may be conducted. Further, the netlist data is offered to describe the functional relationship of the chip devices in a gate-level. The netlist data is transformed from the gate-level view to a transistor-level view. The term "netlist" used herein refers to both graphical-based representation such as a schematic and/or a text-based representation of a circuit.

Then, the gate-level netlist data is verified at the pre-layout simulation stage 840. At the verification process of the stage 840, if some of the functions fail the verification in the simulation, the design flow 80 may be paused temporarily and go back to the stages 810 or 820 for further correction or modification. After the pre-layout simulation stage 840, the chip design has passed a preliminary verification and completed the front-end design process. Subsequently, a back-end physical design process will follow.

At the placement and routing stage 850, a physical architecture representing the circuits determined during the front-end process is implemented. The detailed structure and associated geometry of each component and device are determined in the placement operation, and interconnects among different components are routed subsequent to the placement operation. Moreover, the placement operation involves deciding where to place each chip component and circuitry in a limited amount of space, and the routing operation decides the actual wiring of connecting lines. Both operations of placement and routing are performed to meet a design rule check (DRC) deck, such as from the chip manufacturing facility, so as to fulfill the manufacturing criteria of the chip. After the placement and routing stage 850, a placed-and-routed layout data is created and a netlist with placement and routing data is generated accordingly.

At the parameter extraction stage 860, a layout parameter extraction (LPE) operation is conducted to derive layout-dependent parameters, such as parasitic resistance and capacitance, resulting from a developed layout at the stage 850. In some embodiments, before the layout parameter extraction operation, a layout-versus-schematic (LVS) verification is performed to check the functional performance of the chip in terms of the placed-and-routed netlist. Consequently, a post-layout netlist data is then generated, which includes the layout-dependent parameters.

At the post-layout simulation stage 870, a physical verification is performed by taking the parameters acquired in previous stages into account. At the stage 870, a simulation of transistor-level behavior is conducted in order to examine whether the chip performs the desired functionality within the required system specification. Moreover, the post-layout simulation is performed to ensure no presence of electrical issues or lithographic issues in the chip manufacturing process.

After the post-layout simulation stage 870, it is determined whether the post-layout netlist fulfills the design specification. If affirmative, the circuit design is accepted and then signed off accordingly. However, if the result of the post-layout simulation is unfavorable, the design flow 100 would loop back to previous stages for functionality or performance tuning. For example, the design flow 80 may loop back to the placement and routing stage 850 where the layout is re-developed so as to fix issues from the layout level. Alternatively, the design flow 80 may retreat to earlier stages, either the system design stage 810 or the logic design stage 820 in order to recast the chip design in case the problems cannot be resolved in the back-end stage.

The design flow 80 illustrated in FIG. 6 is exemplary. Other sequences of the stages or operations, partition of the stages, or additional stages before, between or after the stages shown. For example, a NoC architecture comprising a set of NoC modules the interconnection of which transports transactions between at least one master device and at least one slave device is received from a library. A NoC system according to the embodiments of the present disclosure can be generated and exported as a register transfer level (RTL) language description. Subsequently, the NoC system is tested in a verification process in order to determine whether the NoC system meets the requirements for safety under, for example, the ISO 26262 standard, ISO 26262 addresses the needs for an automotive-specific international standard that focuses on safety critical components.

Figure 7:
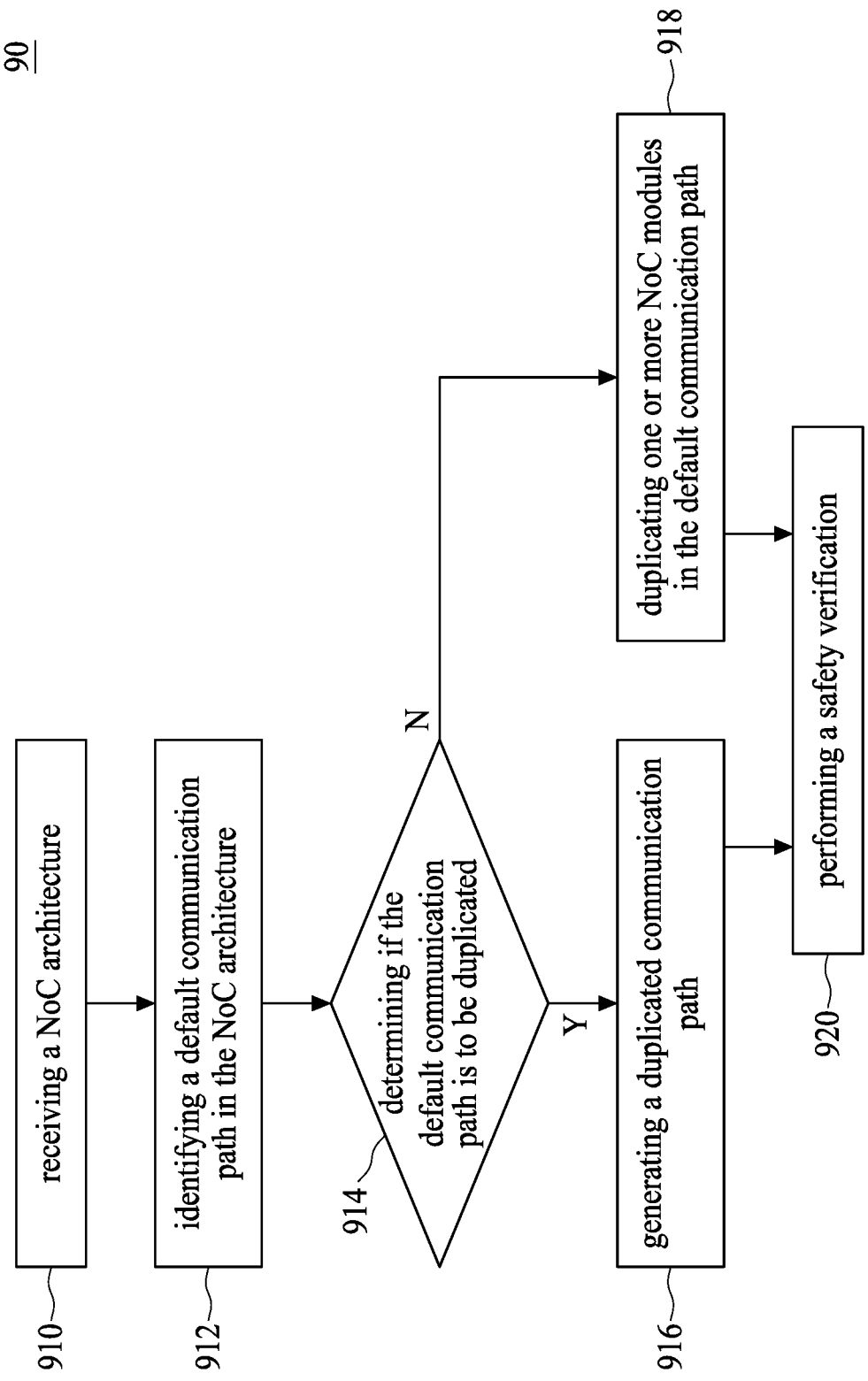
FIG. 7 is flow diagram of a method for generating a NoC system in a chip in accordance with an embodiment.

FIG. 7 is a flow diagram of a method 90 for generating a NoC system in accordance with an embodiment. Referring to FIG. 7, in operation 910, NoC architecture is received from, for example, a library.

In operation 912, a default communication path between a master device and a slave device in the NoC architecture is identified. The default communication path may include a default request path or a default response path.

In operation 914, it is determined whether the default communication path is to be duplicated. If affirmative, in operation 916 a duplicated communication path is generated between the master device and the slave device. The duplicated communication path may include a backup request path or a backup response path. Moreover, in an embodiment the NoC system includes NoC modules disposed along the default communication path routed via a first set of conductive layers, and includes duplicated NoC modules disposed along the duplicated communication path and routed via a second set of conductive layers different from the first set of conductive layers. In another embodiment the NoC system includes a first set of NoC modules disposed along the default communication path, and a second set of NoC modules disposed along the backup communication path. The first set of NoC modules and the second set of modules are routed in a same set of conductive layers.

If in operation 914 the default communication path is not duplicated, then in operation 918 one or more NoC modules in the default communication path are duplicated. In an embodiment, a NoC module of interest, including a master module or a slave module in the default communication, is duplicated. In another embodiment, each of the NoC modules except the master module and the slave module is duplicated.

Subsequently, in operation 920 a verification process is performed to determine if a NoC system generated in operation 916 or operation 918 meets the requirements for safety.

In some embodiments, the present disclosure provides a network-on-chip (NoC) system. The NoC system comprises a default communication path and a backup communication path. The default communication path, disposed between a master device and a slave device, is configured to work in a normal operation state of the chip. The backup communication path, disposed between the master device and the slave device, is configured to replace the default communication path when a fault arises in the default communication path.

In some embodiments, the present disclosure also provides a network-on-chip (NoC) system. The NoC system comprises a default communication path between a master device and a slave device, a first set of NoC modules disposed along the default communication path, and a second set of NoC modules. The NoC modules in the second set are duplicated from one or more NoC modules in the first set.

In some embodiments, the present disclosure provides a method of generating a network-on-chip (NoC) system. The method comprises identifying a default communication path between a master device and a slave device in a NoC architecture, determining whether the default communication path is to be duplicated, generating a duplicated communication path to serve as a backup for the default communication path when determined to duplicate the default communication path, and duplicating one or more NoC modules disposed along the default communication path when determined not to duplicate the default communication path.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A network-on-chip (NoC) system, comprising:
    a default communication path between a master processing device and a slave data device;
    a first set of NoC modules disposed along the default communication path; and
    a second set of NoC modules, the NoC modules in the second set being duplicated from one or more NoC modules in the first set, wherein the first set of NoC modules are operatively connected along the default communication path in one of a default request path and a default response path between the master processing device and the slave data device, and
    the second set of NoC modules are operatively connected along the other one of the default request path and the default response path between the master processing device and the slave data device, wherein the first set of NoC modules is composed of a slave module associated with the master processing device, a master module associated with the slave data device, a synchronizer module and a router module, and the second set of NoC modules is composed of a duplicated synchronizer module and a duplicated router module.

2. The NoC system according to claim 1, wherein each of the NoC modules in the first set is duplicated in the second set.

3. The NoC system according to claim 1 further comprising:
    a safety controller configured to issue a signal in response to a fault detected; and
    a data checker disposed between the safety controller and one of the master processing device and the slave data device.

4. The NoC system according to claim 3, wherein in the second set of NoC modules includes a slave module duplicated from the first set of NoC modules, and the data checker is disposed between the duplicated slave module and the safety controller.

5. The NoC system according to claim 3, wherein the second set of NoC modules includes a master module duplicated from the first set of NoC modules, and the data checker is disposed between the duplicated master module and the safety controller.

6. The NoC system according to claim 3, wherein the data checker is disposed between the duplicated synchronizer module and the safety controller.

7. The NoC system according to claim 3, wherein the data checker is disposed between the duplicated router module and the safety controller.

8. A network-on-chip (NoC) system, comprising:
    a default communication path between a master processing device and a slave data device;
    a first set of NoC modules disposed along the default communication path and routed via a first set of conductive layers; and
    a second set of NoC modules disposed between the master processing device and the slave data device, and routed via a second set of conductive layers, the first set of conductive layers being different from the second set of conductive layers, wherein the first set of NoC modules are operatively connected along the default communication path in one of a default request path and a default response path between the master processing device and the slave data device, and
    the second set of NoC modules are operatively connected along the other one of the default request path and the default response path between the master processing device and the slave data device, the second set of NoC modules including a duplicate of at least one of the NoC modules of the first set, wherein the first set of NoC modules is composed of a slave module associated with the master processing device, a master module associated with the slave data device, a synchronizer module and a router module, and the second set of NoC modules is composed of a duplicated synchronizer module and a duplicated router module.

9. The NoC system according to claim 8, wherein the first NoC modules disposed along the default communication path and the second NoC modules disposed between the master processing device and the slave data device are placed close to each other.

10. The NoC system according to claim 8 further comprising:
    a safety controller configured to issue a signal in response to a fault detected; and
    a data checker disposed between the safety controller and one of the master processing device and the slave data device.

11. The NoC system according to claim 10, wherein the second set of NoC module includes a slave module duplicated from the first set of NoC modules, and the data checker is disposed between the duplicated slave module and the safety controller.

12. The NoC system according to claim 10, wherein the second set of NoC module includes a master module duplicated from the first set of NoC modules, and the data checker is disposed between the duplicated master module and the safety controller.

13. The NoC system according to claim 10, wherein the data checker is disposed between the duplicated synchronizer module and the safety controller.

14. The NoC system according to claim 10, wherein the data checker is disposed between the duplicated router module and the safety controller.

15. A network-on-chip (NoC) system, comprising:
a default communication path between a master processing device and a slave data device;
a first set of NoC modules disposed along the default communication path; and
a second set of NoC modules disposed between the master processing device and the slave data device;
wherein the first set of NoC modules and the second set of NoC modules are routed in a same set of conductive layers, wherein the first set of NoC modules are operatively connected along the default communication path in one of a default request path and a default response path between the master processing device and the slave data device, and the second set of NoC modules are operatively connected along the other one of the default request path and the default response path between the master processing device and the slave data device, the second set of NoC modules including a duplicate of at least one of the NoC modules of the first set, wherein the first set of NoC modules is composed of a slave module associated with the master processing device, a master module associated with the slave data device, a synchronizer module and a router module, and the second set of NoC modules is composed of a duplicated synchronizer module and a duplicated router module.

* * * * *